United States Patent
Naganawa et al.

(10) Patent No.: US 10,636,196 B2
(45) Date of Patent: Apr. 28, 2020

(54) IMAGE PROCESSING APPARATUS, METHOD OF CONTROLLING IMAGE PROCESSING APPARATUS AND NON-TRANSITORY COMPUTER-READABLE STORAGE MEDIUM

(71) Applicant: CANON KABUSHIKI KAISHA, Tokyo (JP)

(72) Inventors: Yoshihiro Naganawa, Yokohama (JP); Itaru Otomaru, Kawasaki (JP); Takaaki Endo, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/140,924

(22) Filed: Sep. 25, 2018

(65) Prior Publication Data

US 2019/0102932 A1  Apr. 4, 2019

(30) Foreign Application Priority Data

Oct. 3, 2017  (JP) .................... 2017-193820

(51) Int. Cl.
| | | |
|---|---|---|
| G06T 15/08 | (2011.01) | |
| G06K 9/32 | (2006.01) | |
| G06T 19/20 | (2011.01) | |
| G06T 7/50 | (2017.01) | |
| G06T 15/10 | (2011.01) | |
| G06T 7/73 | (2017.01) | |
| G06T 19/00 | (2011.01) | |

(52) U.S. Cl.
CPC ............ *G06T 15/08* (2013.01); *G06K 9/3233* (2013.01); *G06T 7/50* (2017.01); *G06T 7/73* (2017.01); *G06T 15/10* (2013.01); *G06T 19/00* (2013.01); *G06T 19/20* (2013.01); *G06T 2207/10081* (2013.01); *G06T 2207/30096* (2013.01); *G06T 2219/008* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 6,370,417 B1 * | 4/2002 | Horbaschek | A61B 6/12 378/20 |
| 7,411,594 B2 | 8/2008 | Endo et al. | |
| 7,626,596 B2 | 12/2009 | Kotake et al. | |
| 7,791,618 B2 | 9/2010 | Endo et al. | |
| 8,350,897 B2 | 1/2013 | Endo et al. | |
| 8,611,989 B2 | 12/2013 | Roberts | |

(Continued)

FOREIGN PATENT DOCUMENTS

| | | |
|---|---|---|
| JP | H08-030769 A | 2/1996 |
| JP | 2012-115635 A | 6/2012 |

*Primary Examiner* — Said Broome
(74) *Attorney, Agent, or Firm* — Venable LLP (57) ABSTRACT

An image processing apparatus obtains information representing a region of interest from a three-dimensional image, and, when a projection direction of the three-dimensional image is changed, based on the projection direction and the information representing the region of interest, determines a parameter that indicates a thickness of projection used in projection processing. The image processing apparatus uses the determined parameter to generate a projection image by applying projection processing toward the projection direction to the three-dimensional image.

16 Claims, 10 Drawing Sheets

(56) References Cited

U.S. PATENT DOCUMENTS

| | | |
|---|---|---|
| 9,721,538 B2 | 8/2017 | Naganawa |
| 9,808,213 B2 | 11/2017 | Endo et al. |
| 9,909,854 B2 | 3/2018 | Yoshibayashi et al. |
| 2009/0003668 A1* | 1/2009 | Matsumoto ............ A61B 5/055 382/128 |
| 2012/0136236 A1 | 5/2012 | Roberts |
| 2017/0039776 A1 | 2/2017 | Endo et al. |
| 2017/0287445 A1 | 10/2017 | Naganawa |
| 2018/0025501 A1 | 1/2018 | Endo et al. |
| 2018/0025548 A1 | 1/2018 | Endo et al. |
| 2018/0192881 A1 | 7/2018 | Endo et al. |

* cited by examiner

IMAGE PROCESSING APPARATUS, METHOD OF CONTROLLING IMAGE PROCESSING APPARATUS AND NON-TRANSITORY COMPUTER-READABLE STORAGE MEDIUM

BACKGROUND OF THE INVENTION

Field of the Invention

The present invention relates to an image processing apparatus that generates a two-dimensional projection image from a three-dimensional image captured by an image capturing apparatus (a modality), a method of controlling the image processing apparatus, and a non-transitory computer-readable storage medium.

Description of the Related Art

In the medical field, a doctor observes a medical image captured in accordance with various modalities, such as a magnetic resonance imaging apparatus (hereinafter referred to as an MRI (Magnetic Resonance Imaging) apparatus), a computed tomography apparatus (hereinafter referred to as an X-ray CT (Computed Tomography) apparatus), an ultrasonic diagnosis apparatus, and a photoacoustic tomography apparatus (hereinafter referred to as a PAT (PhotoAcoustic Tomography) apparatus). If the medical image is a three-dimensional image, the doctor views the three-dimensional medical image from various angles, or observes it after performing projection processing. Japanese Patent Laid-Open No. 2012-115635 (hereinafter, D1) and Japanese Patent Laid-Open No. 08-030769 (hereinafter, D2) propose, in the projection processing for a three-dimensional medical image, configurations for improving visibility when making an observation. In D1, when performing a projection display of a tube-shaped structure such as a blood vessel, the structure is divided into a plurality of regions, and a parameter regarding the thickness of the projection processing is set for each region. In addition, in D2, projection processing in accordance with various projection directions is performed in order to generate projection images are projected onto a three-dimensional image in various directions.

D1 discloses a technique for determining a parameter regarding the thickness of projection processing so as to include a region of interest, but a projection direction is fixed. Meanwhile, D2 discloses a technique for performing a projection display while causing a three-dimensional image to rotate, but a parameter regarding the thickness of the projection processing is fixed without regard to the projection direction. Therefore, there are problems such as the occurrence of a loss of a region that should be observed or the mixing in of a region unnecessary for observation, in accordance with an observation direction (a projection direction).

SUMMARY OF THE INVENTION

In an embodiment of the present invention, description is made of an image processing apparatus that can obtain a projection image that renders with high visibility a region of interest that should be observed in a three-dimensional image, even if a projection direction is changed, and a method of controlling the same.

According to one aspect of the present invention, there is provided an image processing apparatus, comprising: an obtaining unit configured to obtain, from a three-dimensional image, information that represents a region of interest; a changing unit configured to change a projection direction of the three-dimensional image; a projecting unit configured to generate a projection image by applying projection processing toward the projection direction to the three-dimensional image; and a determining unit configured to determine, in accordance with a change of the projection direction by the changing unit and based on the information that represents the region of interest and the changed projection direction, a parameter that indicates a thickness of a projection used in the projection processing.

According to another aspect of the present invention, there is provided an image processing apparatus, comprising: an obtaining unit configured to obtain, from a three-dimensional image, information that represents a region of interest; a setting unit configured to set a plurality of projection directions with respect to the three-dimensional image; a projecting unit configured to generate a projection image by applying projection processing in each of the plurality of projection directions to the three-dimensional image; and a determining unit configured to, for each of the plurality of projection directions set by the setting unit, determine, based on the projection direction and the information representing the region of interest, a parameter indicating a thickness of projection used in the projection processing.

According to another aspect of the present invention, there is provided a method of controlling an image processing apparatus, the method comprising: obtaining, from a three-dimensional image, information that represents a region of interest; changing a projection direction of the three-dimensional image; generating a projection image by applying projection processing toward the projection direction to the three-dimensional image; and determining, in accordance with a change of the projection direction and based on the information that represents the region of interest and the changed projection direction, a parameter that indicates a thickness of a projection used in the projection processing.

According to another aspect of the present invention, there is provided a method of controlling an image processing apparatus, the method comprising: obtaining, from a three-dimensional image, information that represents a region of interest; setting a plurality of projection directions with respect to the three-dimensional image; generating a projection image by applying projection processing in each of the plurality of projection directions to the three-dimensional image; and for each of the plurality of projection directions that are set, determining, based on the projection direction and the information representing the region of interest, a parameter indicating a thickness of projection used in the projection processing.

According to another aspect of the present invention, there is provided a non-transitory computer-readable storage medium storing a program for causing a computer to execute a method comprising: obtaining, from a three-dimensional image, information that represents a region of interest; changing a projection direction of the three-dimensional image; generating a projection image by applying projection processing toward the projection direction to the three-dimensional image; and determining, in accordance with a change of the projection direction and based on the information that represents the region of interest and the changed projection direction, a parameter that indicates a thickness of a projection used in the projection processing.

According to another aspect of the present invention, there is provided a non-transitory computer-readable storage medium storing a program for causing a computer to execute a method comprising: obtaining, from a three-dimensional image, information that represents a region of interest; setting a plurality of projection directions with respect to the three-dimensional image; generating a projection image by applying projection processing in each of the plurality of projection directions to the three-dimensional image; and for each of the plurality of projection directions that are set, determining, based on the projection direction and the information representing the region of interest, a parameter indicating a thickness of projection used in the projection processing.

Further features of the present invention will become apparent from the following description of exemplary embodiments with reference to the attached drawings.

DESCRIPTION OF THE EMBODIMENTS

Explanation of embodiments of the present invention is given below with reference to the attached drawings. Note that configurations illustrated in the following embodiments are merely examples, and the present invention is not limited to the illustrated configurations.

First Embodiment

In the first embodiment, description is given regarding an example in which a region of interest such as a lesion region in a subject is present and includes a center position of a three-dimensional image in which the subject is captured, and determination is made for a parameter regarding a thickness for projection processing when performing a rotational display centered on this position. In other words, in the first embodiment, the center position of the three-dimensional image becomes a center of rotation of the three-dimensional image (a reference point). Note that, in the first embodiment, it is assumed that ray summation is used for the projection processing.

Figure 1:
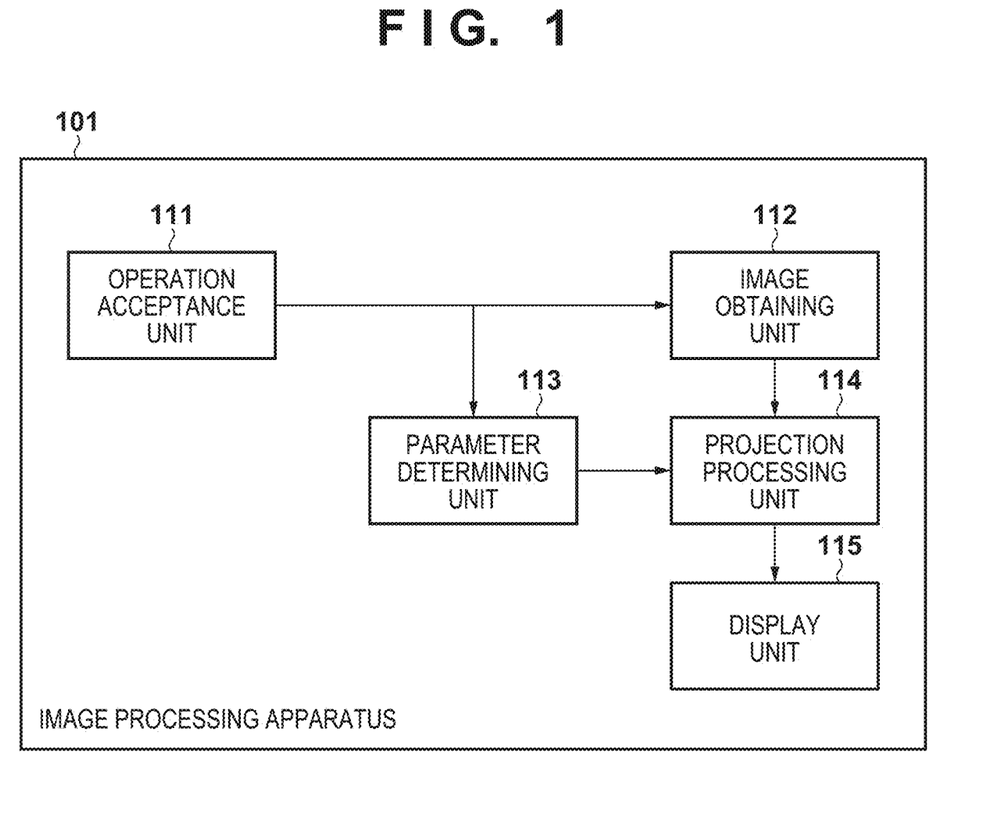
FIG. 1 is a block diagram illustrating an example of a functional configuration of an image processing apparatus according to a first embodiment.

FIG. 1 is a block diagram illustrating an example of a functional configuration of an image processing apparatus 101 according to a first embodiment. An operation acceptance unit 111 accepts, from an operator, an image read designation, a projection display start designation, a projection direction change designation, or the like. An image obtaining unit 112 obtains a three-dimensional image in accordance with the image read designation accepted by the operation acceptance unit 111. In the present embodiment it is assumed that the three-dimensional image is obtained from outside the image processing apparatus 101, but a three-dimensional image held in the image processing apparatus 101 may be obtained. In addition, the image obtaining unit 112 obtains information representing a region of interest from the obtained three-dimensional image. A parameter determining unit 113 determines a parameter relating to the thickness of projection based on information representing the region of interest and a projection direction that is set by the operation acceptance unit 111. Note that a thickness of projection is a projection range that follows the projection direction of projection processing. A projection processing unit 114 applies the parameter (projection thickness) determined by the parameter determining unit 113 to the three-dimensional image, to perform projection processing toward the projection direction set by the operation acceptance unit 111. A display unit 115 performs display control for causing a result of processing by the projection processing unit 114 to be displayed on a display apparatus 205 (FIG. 2).

Figure 2:
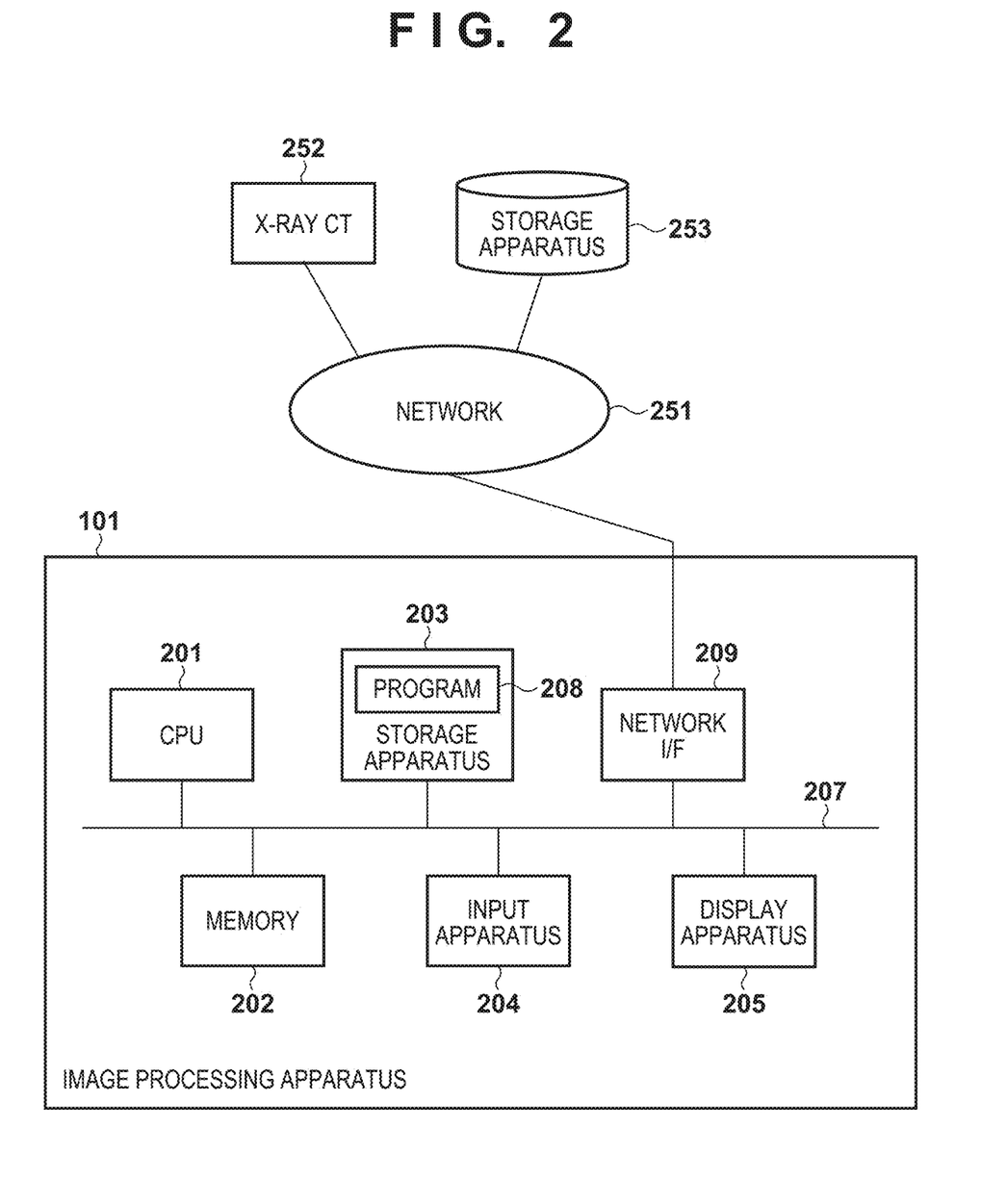
FIG. 2 is a block diagram illustrating an example of a configuration of an image processing system and hardware of the image processing apparatus according to the first embodiment.

FIG. 2 is a view for illustrating an example of a hardware configuration of the image processing apparatus 101 according to the first embodiment. The image processing apparatus 101 is provided with a CPU 201, a memory 202, a storage apparatus 203, and an input apparatus 204, and each of these are connected to one another by a bus 207. Note that FIG. 2 also describes a configuration of an image processing system of the present embodiment. In the image processing system of the present embodiment, an X-ray CT apparatus 252 as an example of a modality for obtaining a three-dimensional image, a storage apparatus 253 storing the three-dimensional image obtained by the X-ray CT apparatus 252, and the image processing apparatus 101 are connected to a network 251.

In the image processing apparatus 101, the CPU 201 executes various functions by executing a program 208 stored in the storage apparatus 203. The memory 202 temporarily stores data or a program read from the storage apparatus 203 by the CPU 201. In addition, the memory 202 is also used as a work region for the CPU 201 to execute various programs. The storage apparatus 203 stores an operating system (OS), various programs, a control program, data, or the like. Note that the program 208 which is for control is stored as some of the data of the storage apparatus 203. The CPU 201 realizes various control in the image processing apparatus 101 by executing the program 208. For example, a function or processing of the image processing apparatus 101 described above in accordance with FIG. 1 is realized by the CPU 201 reading the program 208 stored in the storage apparatus 203, and executing the program. Note that some or all of the functions described above in accordance with FIG. 1 may be realized by dedicated hardware. The input apparatus 204 accepts, from an operator, input of an image read designation, a projection direction designation, or the like. The display apparatus 205 performs various displays under control by the CPU 201. For example, a projection image that is a projection result by the CPU 201 (the projection processing unit 114) is displayed by the display apparatus 205.

Figure 3:
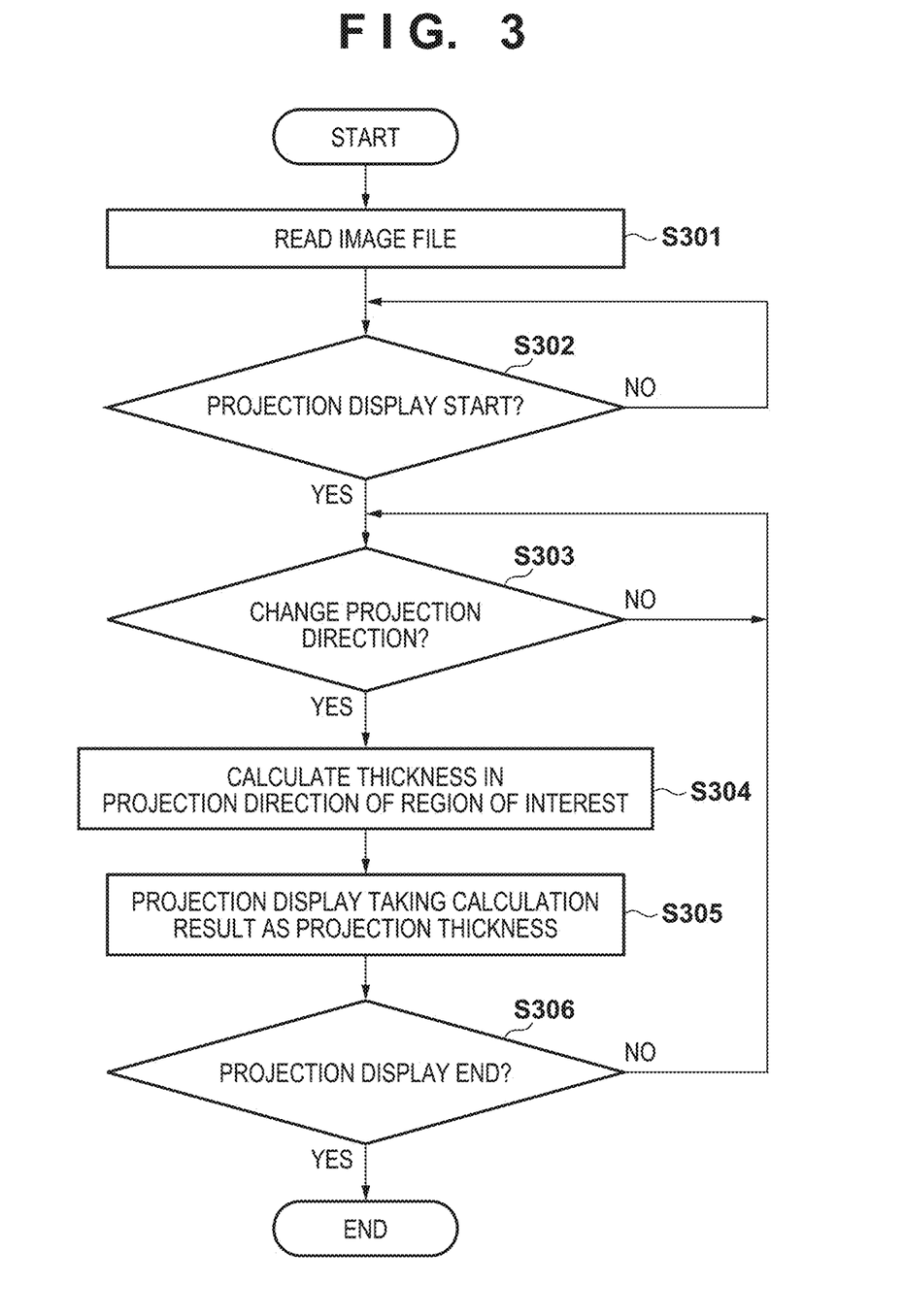
FIG. 3 is a flowchart illustrating details of processing of the image processing apparatus according to a first embodiment.

Next, description is given regarding operation of the image processing apparatus 101 of the present embodiment which is provided with a configuration as above. FIG. 3 is a flowchart illustrating processing for projecting a three-dimensional image, in accordance with the image processing apparatus 101.

In step S301, the image obtaining unit 112, in accordance with a designation (a designation of a three-dimensional image to obtain) accepted by the operation acceptance unit 111, for example, reads the three-dimensional image from the storage apparatus 253, and displays it on the display unit 115. In addition, the image obtaining unit 112 obtains information that represents a region of interest. The information representing the region of interest is, for example, information indicating a shape and a location where the region of interest is present in the three-dimensional space, and can be represented by a set of voxels determined as belonging to the region of interest. In such a case, for example, it is possible to use three-dimensional data, in which the value of a voxel determined as belonging to the region of interest is set to 1 and the values of other voxels are set to 0, as the information representing the region of interest. Note that the information representing the region of interest can be calculated from the three-dimensional image by a publicly known method. In step S302, if the operation acceptance unit 111 has accepted a projection display start designation (YES in step S302), the processing advances to step S303. In contrast, if the operation acceptance unit 111 has not accepted a projection display start designation (NO in step S302), the processing waits until a designation is accepted.

In step S303, if it is determined that the operation acceptance unit 111 has accepted a projection direction change designation (YES in step S303), the processing advances to step S304. Here, "if it is determined that . . . has accepted a projection direction change designation" includes a case where a designation for causing a three-dimensional image to rotate is accepted, and a case for initially performing projection processing. In contrast, if the operation acceptance unit 111 has not accepted a projection direction change designation (NO in step S303), the processing waits until a projection direction change designation is accepted.

Figure 4A:
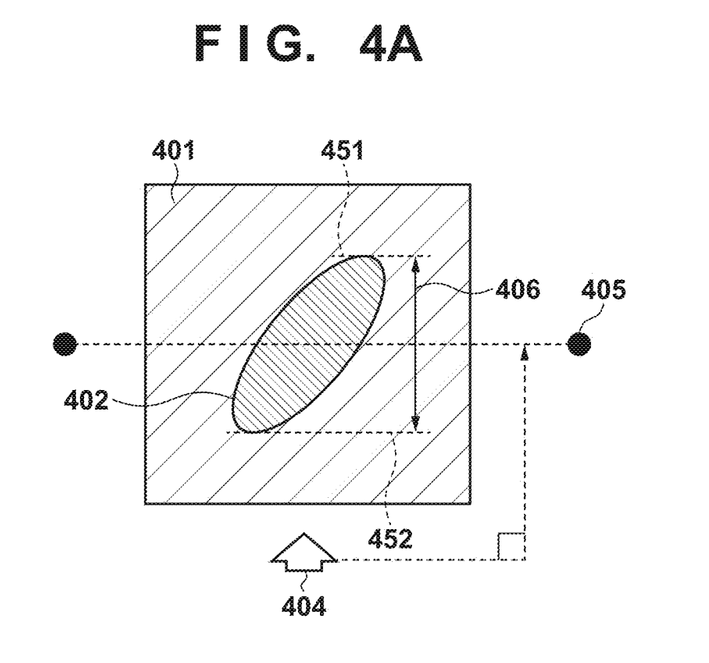
FIGS. 4A and 4B are views for giving a description regarding projection processing according to the first embodiment.

In step S304, the parameter determining unit 113, based on the projection direction after the designated change (step S303) and the obtained information representing the region of interest (step S301), determines the parameter regarding the thickness of the projection processing to be executed in step S305. For example, the parameter determining unit 113 calculates the thickness (projection range) of the region of interest along the changed projection direction. FIG. 4A is a view illustrating an example of a method of calculating a projection range. It is assumed that FIG. 4A represents a cross section of a three-dimensional image. Reference numeral 401 of FIG. 4A represents the entire region (hereinafter referred to as a "volume") of the three-dimensional image. Reference numeral 402 is a region of interest, and, in the present embodiment, represents a lesion region such as a mass. Reference numeral 404 is the projection direction, and is a direction for which designation with respect to the volume 401 was accepted by the operation acceptance unit 111. The projection processing is performed in the direction indicated by the projection direction 404. Reference numeral 405 represents a reference plane for a time of setting the projection range calculated by the parameter determining unit 113. In the present embodiment, the reference plane 405 is a plane that passes through the center position of the three-dimensional image, and is orthogonal with the projection direction 404. Reference numeral 406 represents the projection range (thickness of projection) calculated by the parameter determining unit 113. The distance between a position in the region of interest on a closest side when projecting the region of interest 402 toward the projection direction 404, and a position in the region of interest on a furthest side is the projection range 406.

In other words, in a case where two planes 451 and 452 orthogonal to the projection direction 404 are arranged so that each plane is in contact with the region of interest 402 and the entirety of the region of interest 402 is sandwiched therebetween, the projection range 406 is the range that is sandwiched by the two planes (FIG. 4A). The projection range 406 is determined as the parameter regarding the thickness of projection in the projection processing. Note that the region of interest 402 is a three-dimensional region. However, due to the circumstances of the paper surface, for the region of interest 402 illustrated, a result of projecting the three-dimensional region of interest 402 in a direction orthogonal to the paper surface is illustrated.

Figure 4B:
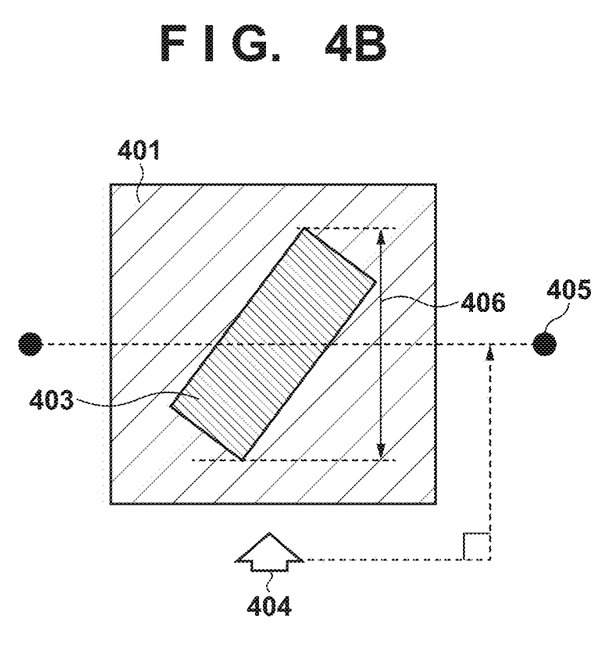

Note that the information representing the region of interest is necessary to calculate the projection range 406, but it is not always necessary to extract it as precisely as indicated by the region of interest 402 of FIG. 4A. For example, as illustrated by FIG. 4B, the projection range may be calculated by deeming a rectangular region 403 which is a region that surrounds the region of interest 402 to be the region of interest. In this way, the process for calculating the projection range 406 is simplified. Note that there is no limitation to a rectangular region as a shape of a region that surrounds the region of interest 402, and it is possible to use a region of that is a polyhedron, a sphere, an ellipsoid, (a prolate spheroid) or the like.

In step S305, the projection processing unit 114 uses the projection range 406 calculated by the parameter determining unit 113 in step S304 to perform projection processing in the designated (changed) projection direction, and generate a two-dimensional projection image. The display unit 115 displays the generated projection image on the display apparatus 205. In step S306, if the operation acceptance unit 111 has accepted a projection display end designation (YES in step S306), this processing ends. However, if a projection display end designation is not accepted, the processing of step S303 and thereafter is repeated. In other words, the projection processing is performed every time the projection direction 404 is switched, and a result thereof is displayed.

Figure 5A:
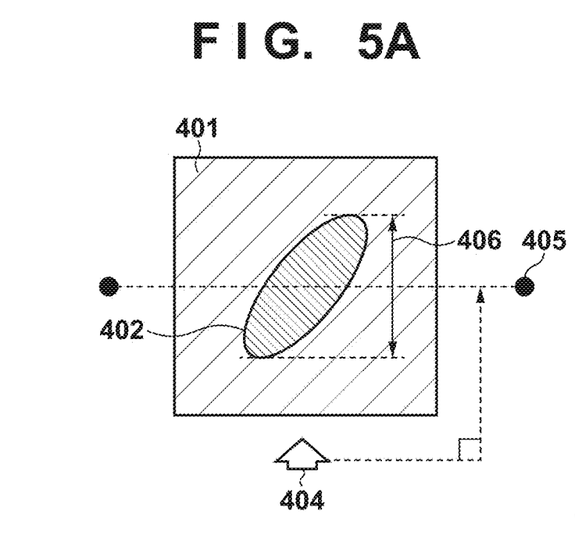
FIGS. 5A through 5C are views for giving a description regarding projection processing according to the first embodiment.
Figure 5B:
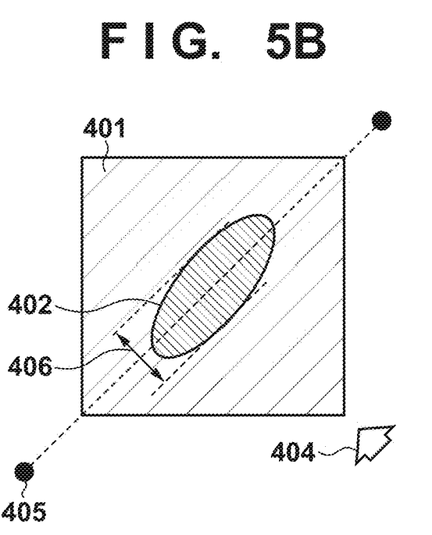
Figure 5C:
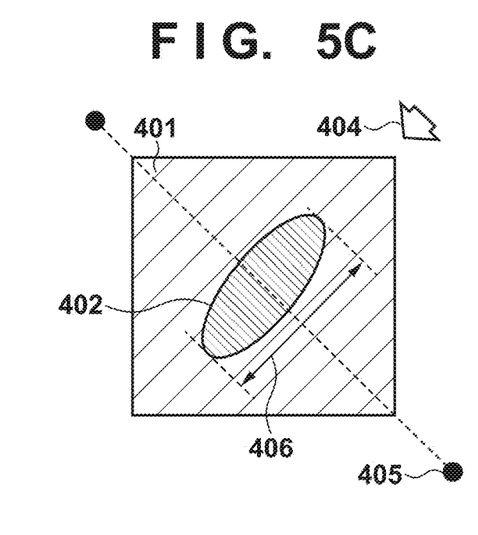

FIG. 5A, FIG. 5B, and FIG. 5C each represent a situation when the projection direction 404 is changed. Because the thickness of the region of interest 402 changes in accordance with the projection direction 404, the projection range 406 is recalculated in accordance with the projection direction 404. In this way, in a projection display of the region of interest 402 in a changed projection direction, it is possible to project the projection image of the region of interest without excess or deficiency, and it is possible to reduce mixing of a non-region of interest.

As described above, by virtue of the first embodiment, it is possible to provide a mechanism for rendering a region of interest in a three-dimensional image with high visibility by recalculating the projection range 406 in accordance with the thickness of the region of interest 402 with respect to the projection direction 404.

Figure 11A:
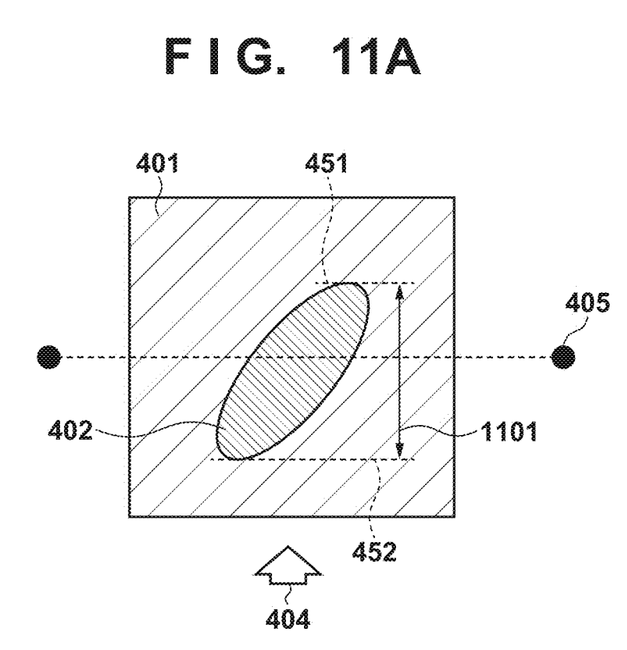
FIGS. 11A and 11B are views for describing a method for determining a projection range (thickness).
Figure 11B:
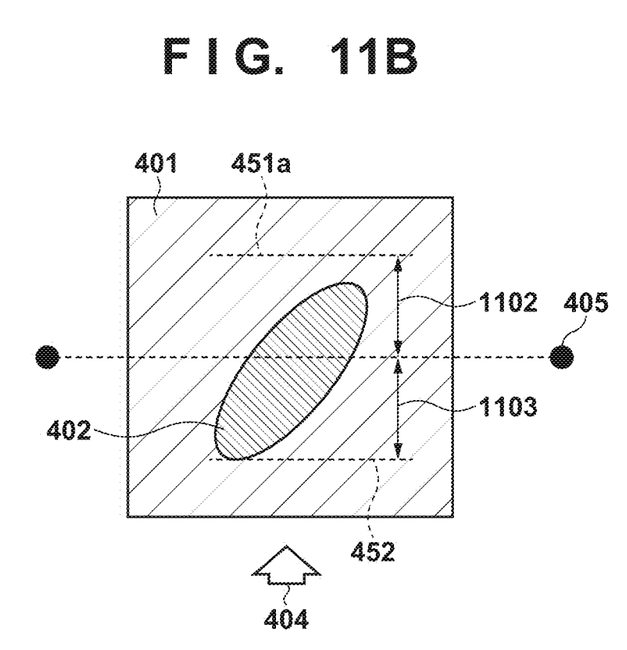

Note that, in the foregoing embodiment, the distance between a position in the region of interest on a closest side when projecting the region of interest 402 toward the projection direction 404, and a position in the region of interest on a furthest side is the projection range. Accordingly, as illustrated by a projection range 1101 in FIG. 11A, for example, there are cases where the projection range does not have equal distance on both sides of the reference plane 405. Here, in the projection processing, there are cases where it is desirable to use a range having equal lengths with respect to the reference plane 405 as the thickness of projection. Accordingly, configuration may be taken such that, of the two planes 451 and 452, the distance to the plane furthest from the reference plane 405 (a distance 1103 to the plane 452 in FIG. 11B) is set for both sides of the reference plane 405 (planes 451a and 452), and this is set as the projection range (the thickness of projection). In FIG. 11B a distance 1102 and the distance 1103 are equal.

(First Variation of First Embodiment)

In the first embodiment, although the projection range 406 is calculated to so as to precisely include the shape of the region of interest 402, but the projection range 406 may be expanded as necessary. For example, there are cases where there is a desire to observe not only the region of interest 402 but also its boundary and periphery. In these cases, it is possible to render a necessary area with high visibility by performing projection processing after adding a necessary distance for a boundary and its periphery to the calculated projection range 406. In such a case, for example, it is possible to have the thickness of the projection processing be a range resulting from adding a predetermined distance to the range determined in accordance with the two planes orthogonal to the projection direction 404 that sandwiches the entirety of the region of interest 402 described in relation to FIG. 4A. Alternatively, a region resulting from adding a predetermined distance to the outer side of the region of interest obtained from the three-dimensional image may be used as the region of interest 402.

(Second Variation of First Embodiment)

In the first embodiment, description was given regarding a case of using ray summation for the projection processing, but the type of projection processing is not limited. For example, it is possible to apply various types of projection processing, such as Maximum Intensity Projection and Minimum Intensity Projection.

Second Embodiment

In the first embodiment, description was given regarding an example in which the center position of a three-dimensional image is taken as the center of rotation (reference point) of the three-dimensional image, and the region of interest is located so as to include the center position. In contrast to this, in the second embodiment, description is given regarding a case in which the center of rotation (reference point) of a three-dimensional image is any position in the three-dimensional image, and the region of interest is present so as to not include the center of rotation. Note that the functional configuration and hardware configuration of the image processing apparatus 101 according to the second embodiment is similar to that of the image processing apparatus 101 according to the first embodiment (FIG. 1 and FIG. 2).

Figure 6:
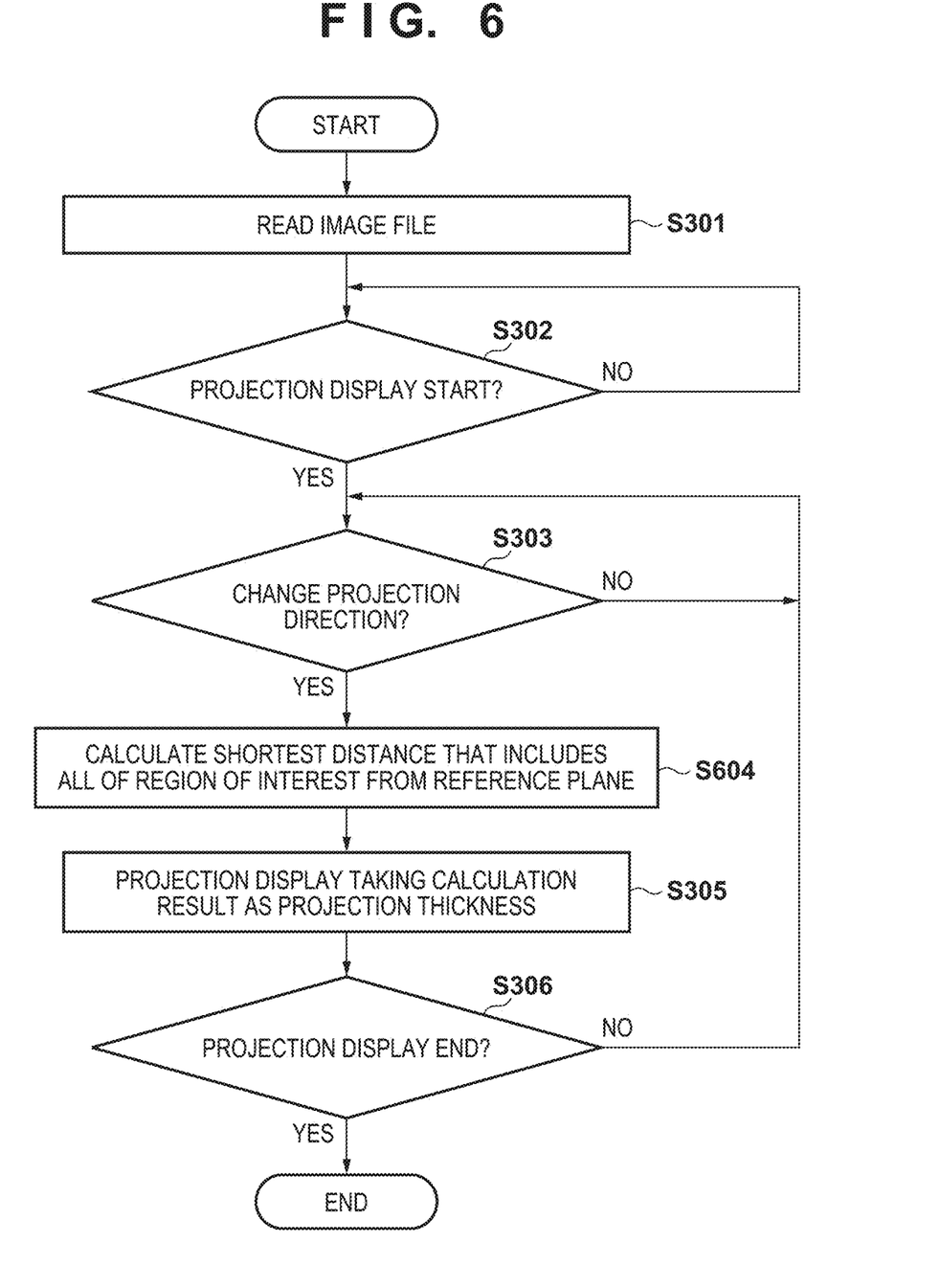
FIG. 6 is a flowchart illustrating details of processing of the image processing apparatus according to a second embodiment.

FIG. 6 is a flowchart illustrating processing for projecting a region of interest in a three-dimensional image, in accordance with the image processing apparatus 101 of the second embodiment. Note that processing steps in common with the processing steps in the first embodiment (FIG. 3) have the same reference numeral as in the first embodiment added thereto.

The image obtaining unit 112 reads in a three-dimensional image (step S301), and the processing of step S604 is executed when the operation acceptance unit 111 accepts a projection display start designation (YES in step S302) and the operation acceptance unit 111 accepts a projection direction change designation (YES in step S303). In step S604, the parameter determining unit 113 calculates the shortest distance that includes all of the region of interest from a reference plane for performing the projection processing, and determines the projection range 406 by setting this distance on both sides of the reference plane. The projection processing unit 114 uses the projection range 406 calculated by the parameter determining unit 113 in step S604 to perform projection processing, and displays a result thereof on the display unit 115 (step S305).

Figure 7:
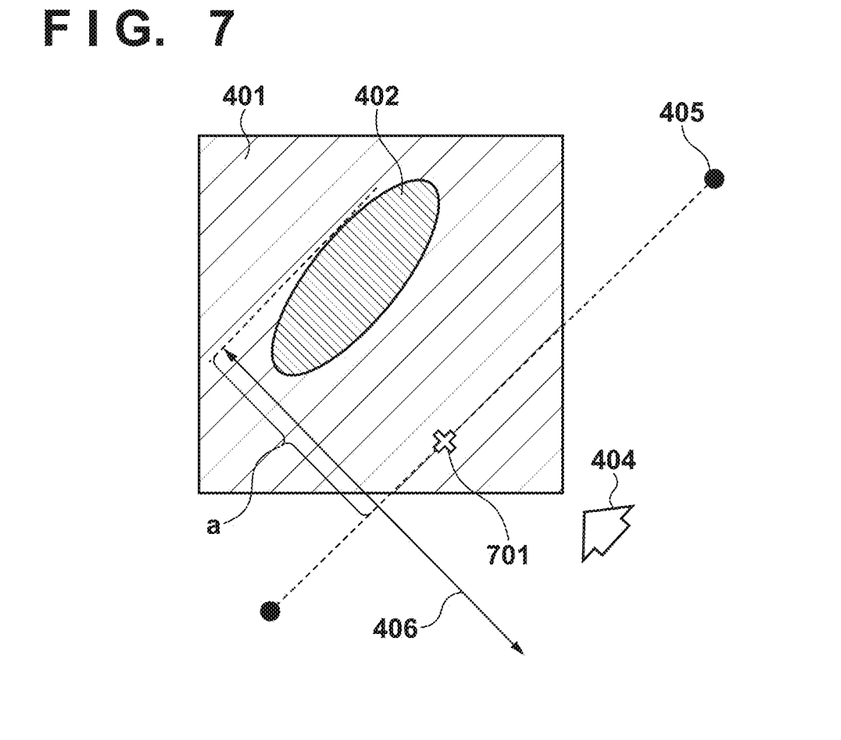
FIG. 7 is a view for giving a description regarding projection processing according to the second embodiment.

FIG. 7 illustrates an example of a case in which a center of rotation (reference point) 701 for a three-dimensional image is an arbitrary position in the three-dimensional image, and the region of interest 402 does not include the center of rotation. When projection processing is performed in this state, the projection processing unit 114 uses, as the projection range 406, in projection processing a distance that is twice a distance a from the reference plane 405 to the furthest position of the region of interest 402 toward the projection direction 404. In other words, a projection range of the distance a is set on both sides of the reference plane 405. Note that a distance for the periphery of a boundary may be added to the distance a, as described in the first variation of the first embodiment.

For example, when the center of rotation 701 and the projection direction 404 of the three-dimensional image are designated by a user operation, the reference plane 405 is determined to be the plane that passes through the center of rotation 701, as shown in the figure. When the projection direction is changed, the reference plane 405 rotates centered on the center of rotation 701 so as to maintain a state of being orthogonal to the projection direction. Accordingly, depending on the projection direction, there are cases where the reference plane 405 passes through the region of interest 402. Accordingly, configuration may be taken such that, in a case where the reference plane set from the relationship between the projection direction and the center of rotation 701 is included in the region of interest, the projection range is determined in accordance with the procedure of the first embodiment, and, in a case where the reference plane is not included in the region of interest, the projection range is determined in accordance with the procedure of the second embodiment.

As described above, by virtue of the second embodiment, even if a situation occurs where the reference plane is not included in the region of interest due to the rotation of the three-dimensional image, for example, it is possible to appropriately set the projection range. By virtue of the second embodiment, it is possible to provide a mechanism for rendering a region of interest in a three-dimensional image with high visibility even if the projection direction changes, regardless of the position of the region of interest and a reference plane at which projection processing is performed.

(First Variation of Second Embodiment)

In the second embodiment, it is possible to perform projection display of a region of interest without deficiencies even if the projection direction changes, but if the region of interest 402 and the reference plane 405 for the projection processing are separated, projection processing for a separated space will be included, and a possibility that noise will be included increases. Accordingly, configuration may be taken such that, when the region of interest 402 and the reference plane 405 for projection processing are separated by more than a predetermined distance, the projection processing is performed after automatically causing the reference plane 405 for projection processing to move so as to include a predetermined position inside the region of interest 402 (for example, a center or centroid). Note that, for the distance between the region of interest 402 and the reference plane 405 for projection processing, for example, it is sufficient if a distance to the position of an outer contour of the region of interest 402 that is closest to the reference plane is used. However, there is no limitation to this, and the distance from the reference plane to the center/centroid of the region of interest may be used.

Figure 8:
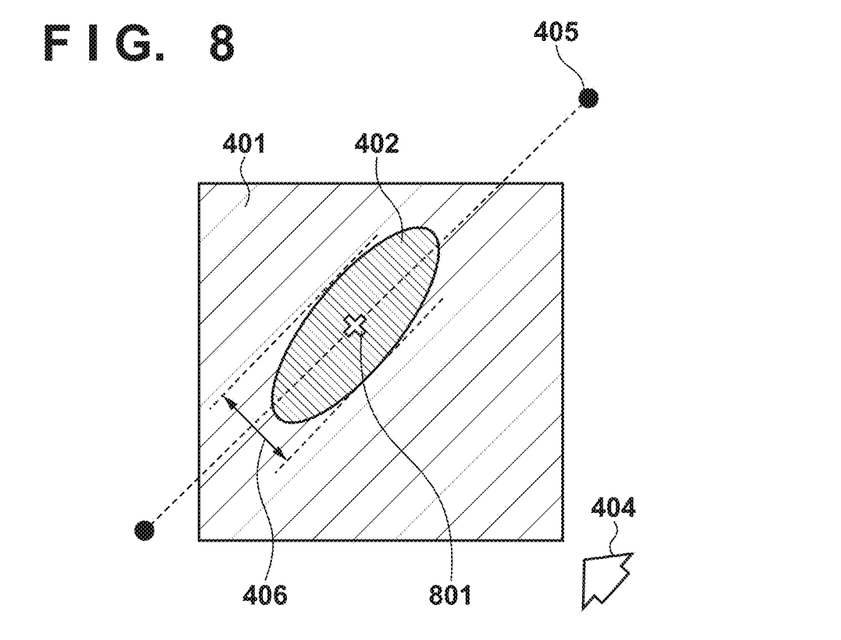
FIG. 8 is a view for giving a description regarding projection processing according to a variation of the second embodiment.

FIG. 8 is a view that illustrates a state where the reference plane 405 for projection processing has been caused to move so as to include the center/centroid of the region of interest 402, from the state illustrated in FIG. 7. In FIG. 8, a reference numeral 801 indicates the center or centroid of the region of interest 402 (written as the center 801 below), and the reference plane 405 of projection processing is caused to translate so as to pass through the center 801. Subsequently, similar to in the first embodiment (or a variation thereof), projection processing is performing by taking as the projection range 406 a distance in the projection direction between, when the region of interest 402 is projected toward the projection direction 404, a closest position of the region of interest and a furthest position of the region of interest. In this way, it is possible to resolve the problem described above.

Third Embodiment

In the first embodiment and the second embodiment, description was made for examples of cases in which projection in one direction is performed with respect to one three-dimensional image, and a result thereof is displayed. In the third embodiment, description is given for an example of a case where a plurality of projections are simultaneously performed from differing projection directions with respect to one three-dimensional image, and results thereof are displayed simultaneously. Note that the functional configuration and hardware configuration of the image processing apparatus 101 according to the third embodiment is similar to that of the image processing apparatus 101 according to the first embodiment.

Figure 9A:
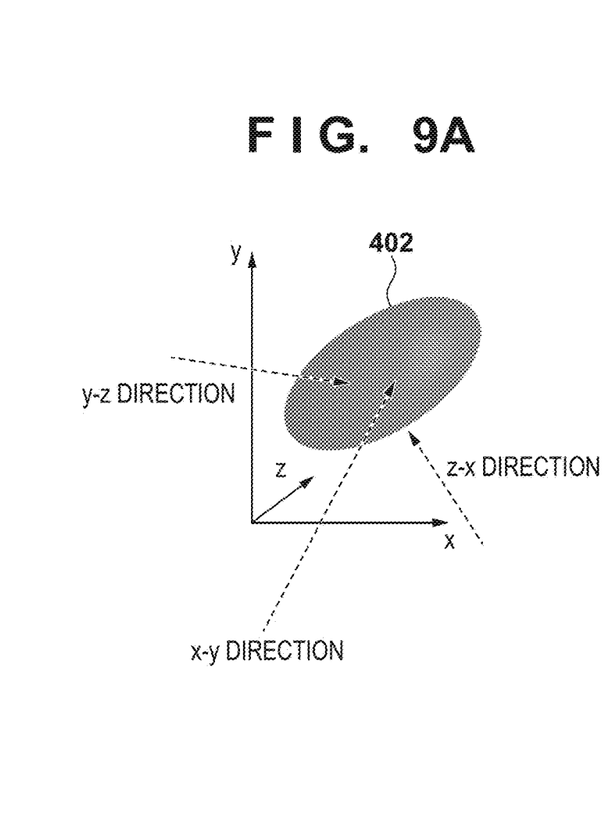
FIGS. 9A and 9B are views for giving a description regarding projection processing according to a third embodiment.

FIG. 9A is a view that represents the region of interest 402 in a three-dimensional space. The region of interest 402 here is a prolate spheroid, and it is not necessarily the case that an appropriate projection image display will be achieved if a projection range applied in one projection direction is applied in a different projection direction. Accordingly, in the third embodiment, an appropriate projection range is applied for each projection direction. In the present embodiment, projection processing is performed from three projection directions, and obtained projection images are displayed simultaneously.

Figure 9B:
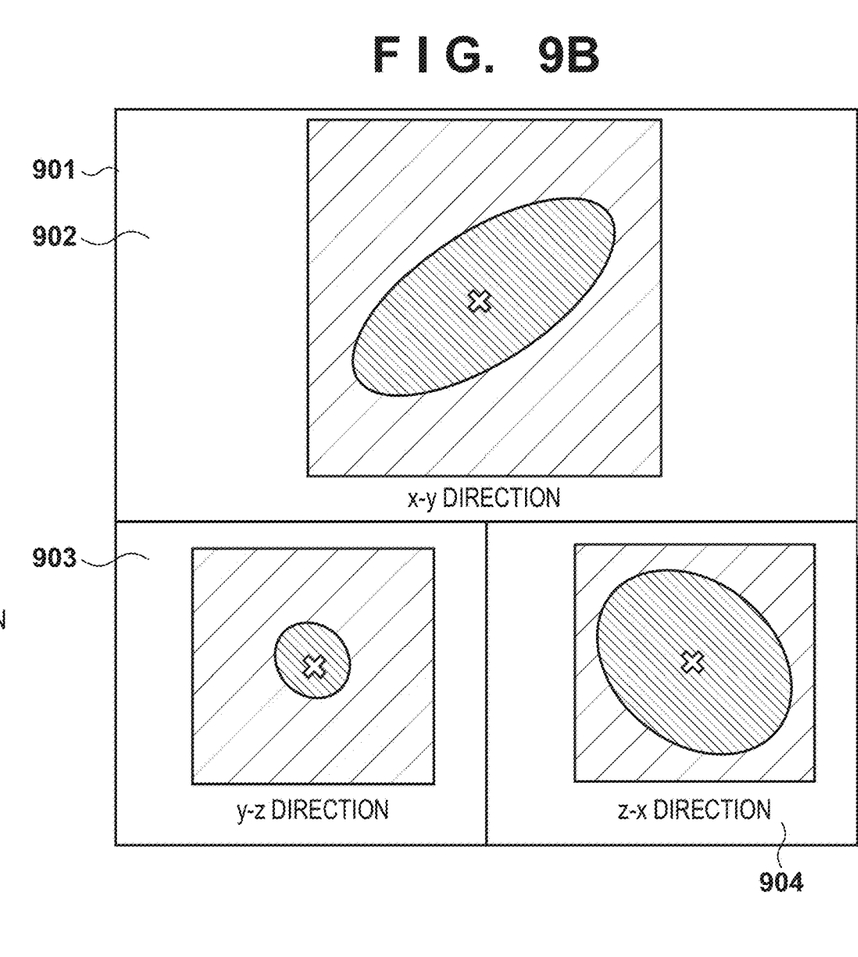

FIG. 9B is a view that illustrates an example in which an appropriate projection range is applied to each of the three projection directions. In a screen 901, projection images obtained by projecting onto the region of interest 402 from three projection directions are displayed simultaneously. Results of performing projection processing in respective projection directions are displayed in partial screens 902, 903, and 904. In each projection processing, the center of rotation of the projection processing is taken as the center of the region of interest 402, the reference plane of the projection processing is set so as to pass through the center of the region of interest 402, and an appropriate projection range (thickness) is set for each projection direction by a method described in the first embodiment or the second embodiment. In other words, when projection is performed in each projection direction, the distance in the projection direction between a closest position of the region of interest and a furthest position of the region of interest is set as the projection range. In this way, even if projection processing in accordance with a plurality of projection directions is performed simultaneously, for each projection direction, an appropriate projection range is applied and a projection image is generated. Note that there is no need to set the center of rotation to the center of the region of interest, and for example the center of rotation may be provided outside of the region of interest. In such a case, because there are cases where the reference plane is included in the region of interest and cases where the reference plane is not included in the region of interest depending on the direction of projection, the projection processing of the first or second embodiments described above may be applied for each projection direction.

As described above, by the third embodiment, even in a case of performing projection processing in a plurality of different directions at the same time, it is possible to provide a mechanism for rendering a region of interest in a three-dimensional image with high visibility.

Fourth Embodiment

In the first to third embodiments, description was given of examples of cases where there is one region of interest in a three-dimensional image, but, in the fourth embodiment, description is given for an example of a case where there are a plurality of regions of interest in a three-dimensional image. Note that the functional configuration and hardware configuration of the image processing apparatus 101 according to the fourth embodiment is similar to that of the image processing apparatus 101 according to the first embodiment.

Figure 10A:
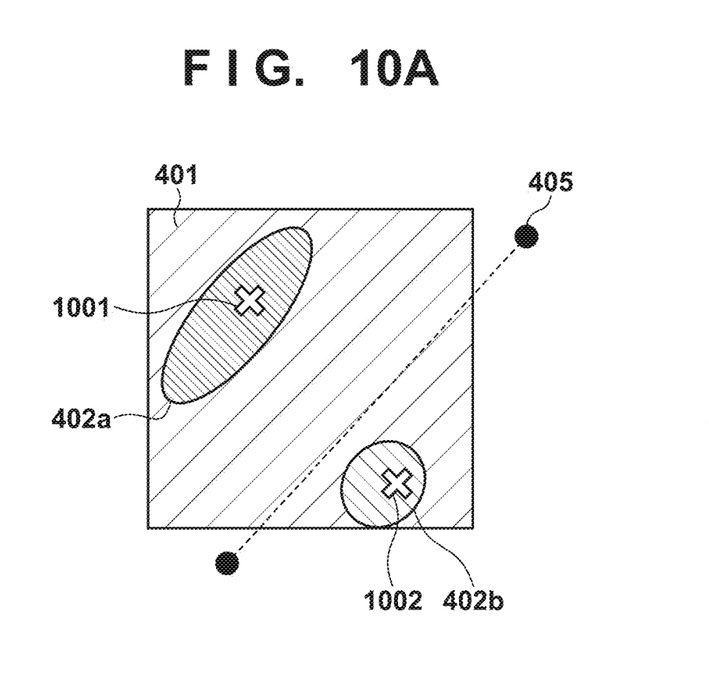
FIGS. 10A and 10B are views for giving a description regarding projection processing according to a fourth embodiment.
Figure 10B:
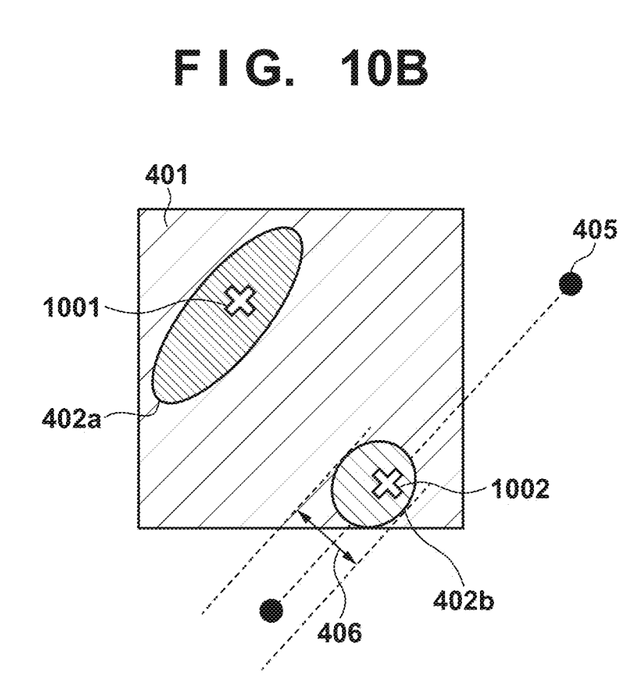

FIG. 10A is a view that illustrates an example in which there are a plurality of regions of interest in a three-dimensional image. Two regions of interest 402a and 402b are present in the volume 401. Respective centers for the regions of interest 402a and 402b are indicated by reference numerals 1001 and 1002. In addition, the reference plane 405 to which the projection range is applied is the position indicated in FIG. 10A. When a projection start designation is performed, a region of interest closest to the reference plane 405 (in other words one having the shortest distance to the reference plane 405) is handled as a highest-interest target. In the case of the example of FIG. 10A, because the region of interest 402b is close to the reference plane 405, the reference plane 405 is caused to move so as to include the center 1002 of the region of interest 402b as in FIG. 10B. Subsequently, the projection range is determined by the method described in the first embodiment, and projection processing is performed.

Note that, as the distance between the reference plane 405 and the region of interest, it is possible to use the distance from the reference plane 405 to the center/centroid of the region of interest, or the shortest distance of distances from the reference plane 405 to an outer contour of the region of interest. In addition, out of the plurality of regions of interest in the volume 401, if there is a region of interest that includes the reference plane 405, the region of interest may be handled as the highest-interest target.

As described above, by the fourth embodiment, even in a case where there are a plurality of regions of interest, it is possible to provide a mechanism for rendering a region of interest in a three-dimensional image with high visibility.

Another Embodiment

While examples of the embodiments are described in detail above, embodiments for the present invention as, for example, a system, an apparatus, a method, a program, a recording medium (a storage medium), or the like are possible. Specifically, the present invention may be applied to a system configured from a plurality of devices (for example, a host computer, an interface device, an image capturing apparatus, a Web application, and the like), and may be applied to an apparatus comprising one device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-193820, filed Oct. 3, 2017, which is hereby incorporated by reference herein in its entirety.

What is claimed is:

1. An image processing apparatus, comprising:
   an obtaining unit configured to obtain, from a three-dimensional image, information that represents a region of interest;
   a changing unit configured to change a projection direction of the three-dimensional image;
   a determining unit configured to determine a parameter such that a thickness, in which the region of interest is included in the changed projection direction, represents a range sandwiched by two planes, in contact with the region of interest, orthogonal to the changed projection direction; and
   a projecting unit configured to generate a projection image by applying projection processing to the three-dimensional image using the parameter determined by the determining unit.

2. The apparatus according to claim 1, wherein the determining unit determines the parameter such that the thickness represents a range resulting from adding a predetermined distance to the range that sandwiches the entirety of the region of interest by the two planes as the parameter that indicates the thickness.

3. An image processing apparatus, comprising:
   an obtaining unit configured to obtain, from a three-dimensional image, information that represents a region of interest;
   a changing unit configured to change a projection direction of the three-dimensional image;
   a setting unit configured to set a reference plane that is a plane orthogonal to the changed projection direction;
   a determining unit configured to determine a parameter such that a thickness represents a range obtained by setting a distance in the changed projection direction from the reference plane to a furthest position of the region of interest; and
   a projecting unit configured to generate a projection image by applying projection processing to the three-dimensional image using the parameter determined by the determining unit.

4. The apparatus according to claim 3, wherein the determining unit, (a) in a case where the region of interest includes the reference plane, determines the parameter such that the thickness represents a range in which the region of interest is present along the changed projection direction, and (b) in a case where the region of interest does not include the reference plane, determines the parameter such that the thickness represents a range obtained by setting, on both sides of the reference plane, a range from the reference plane to a furthest position of the region of interest.

5. The apparatus according to claim 3, wherein, in a case where the region of interest does not include the reference plane, the determining unit translates the reference plane so that the reference plane passes through the region of interest.

6. The apparatus according to claim 5, wherein, if a distance between the reference plane and the region of interest exceeds a predetermined distance, the determining unit translates the reference plane so that the reference plane passes through the inside of the region of interest.

7. The apparatus according to claim 3, wherein, if there are a plurality of regions of interest, the thickness is determined for the region of interest closest to the reference plane.

8. The apparatus according to claim 3, wherein, in a case where the three-dimensional image is rotated in accordance with the projection direction, the setting unit sets the reference plane based on the center position of the three-dimensional image, the position of the reference point, and the projection direction.

9. The apparatus according to claim 1, wherein the information representing the region of interest is a set of voxels determined as belonging to the region of interest.

10. The apparatus according to claim 1, wherein the shape of the region of interest is a polyhedron, a sphere, or a prolate spheroid that surrounds a region of interest obtained from the three-dimensional image.

11. The apparatus according to claim 1, wherein the projection processing is one of ray summation, maximum intensity projection and minimum intensity projection.

12. The apparatus according to claim 1, further comprising a display control unit configured to cause the projection image generated by the projecting unit to be displayed on a display unit.

13. A method of controlling an image processing apparatus, the method comprising:
- obtaining, from a three-dimensional image, information that represents a region of interest;
- changing a projection direction of the three-dimensional image;
- determining a parameter such that a thickness, in which the region of interest is included in the changed projection direction, represents a range sandwiched by two planes, in contact with the region of interest, orthogonal to the changed projection direction; and
- generating a projection image by applying projection processing to the three-dimensional image using the determined parameter.

14. A non-transitory computer-readable storage medium storing a program for causing a computer to execute a method comprising:
- obtaining, from a three-dimensional image, information that represents a region of interest;
- changing a projection direction of the three-dimensional image;
- determining a parameter such that a thickness, in which the region of interest is included in the changed projection direction, represents a range sandwiched by two planes, in contact with the region of interest, orthogonal to the changed projection direction; and
- generating a projection image by applying projection processing to the three-dimensional image using the determined parameter.

15. A method of controlling an image processing apparatus, the method comprising:
- obtaining, from a three-dimensional image, information that represents a region of interest;
- changing a projection direction of the three-dimensional image;
- setting a reference plane that is a plane orthogonal to the changed projection direction;
- determining a parameter such that a thickness represents a range obtained based on a distance in the changed projection direction from the reference plane to a furthest position of the region of interest; and
- generating a projection image by applying projection processing to the three-dimensional image using the determined parameter.

16. A non-transitory computer-readable storage medium storing a program for causing a computer to execute a method comprising:
- obtaining, from a three-dimensional image, information that represents a region of interest;
- changing a projection direction of the three-dimensional image;
- setting a reference plane that is a plane orthogonal to the changed projection direction;
- determining a parameter such that a thickness represents a range obtained based on a distance in the changed projection direction from the reference plane to a furthest position of the region of interest; and
- generating a projection image by applying projection processing to the three-dimensional image using the determined parameter.

* * * * *